United States Patent
Sohma

(10) Patent No.: US 8,207,721 B2
(45) Date of Patent: Jun. 26, 2012

(54) SWITCHING REGULATOR CAPABLE OF STABLE OPERATION AND IMPROVED FREQUENCY CHARACTERISTICS IN A BROAD INPUT AND OUTPUT VOLTAGE RANGE AND METHOD FOR CONTROLLING OPERATION THEREOF

(75) Inventor: Shohtaroh Sohma, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 479 days.

(21) Appl. No.: 12/439,789

(22) PCT Filed: Jun. 17, 2008

(86) PCT No.: PCT/JP2008/061389
§ 371 (c)(1),
(2), (4) Date: Mar. 3, 2009

(87) PCT Pub. No.: WO2009/016898
PCT Pub. Date: Feb. 5, 2009

(65) Prior Publication Data
US 2010/0181977 A1   Jul. 22, 2010

(30) Foreign Application Priority Data
Jul. 27, 2007 (JP) ................................. 2007-195865

(51) Int. Cl.
*G05F 1/00* (2006.01)
(52) U.S. Cl. ........................................ 323/282; 323/290
(58) Field of Classification Search .......... 323/282–290
See application file for complete search history.

(56) References Cited

U.S. PATENT DOCUMENTS

| | | | | |
|---|---|---|---|---|
| 5,029,269 A | * | 7/1991 | Elliott et al. | 363/21.1 |
| 5,770,940 A | * | 6/1998 | Goder | 323/282 |
| 6,545,882 B2 | * | 4/2003 | Yang | 363/21.08 |
| 6,946,823 B2 | * | 9/2005 | Huang et al. | 323/282 |

(Continued)

FOREIGN PATENT DOCUMENTS
CN    1405962 A    3/2003
(Continued)

OTHER PUBLICATIONS

Lee et al (Nov. 2003), Sensorless Control Scheme Using Simple Duty Feedback Technique in DC/DC Converters, IEE Proc.-Electr. Power Appl, vol. 150, No. 6, pp. 695-702.*

(Continued)

*Primary Examiner* — Adolf Berhane
*Assistant Examiner* — Emily Pham
(74) *Attorney, Agent, or Firm* — Cooper & Dunham LLP

(57) ABSTRACT

A disclosed switching regulator includes: a switching element switching in accordance with an input control signal; an inductor charged with a supply voltage by the switching of the switching element; a rectifying element discharging the inductor when the switching element is switched off and charging of the inductor is stopped; and a control circuit unit generating an error voltage based on a voltage difference between a proportional voltage and a predetermined reference voltage, generating and outputting a pulse signal with a duty cycle in accordance with the error voltage to a control electrode of the switching element. The control circuit unit generates a feedback voltage from the duty cycle of the pulse signal, generates the pulse signal with the duty cycle from a voltage difference between the generated feedback voltage and the error voltage, and varies the voltage difference from the duty cycle of the pulse signal.

13 Claims, 14 Drawing Sheets

U.S. PATENT DOCUMENTS

| | | | |
|---|---|---|---|
| 7,646,185 B2* | 1/2010 | Kim | 323/283 |
| 2005/0057238 A1* | 3/2005 | Yoshida | 323/282 |
| 2005/0116697 A1* | 6/2005 | Matsuo et al. | 323/282 |
| 2007/0013356 A1* | 1/2007 | Qiu et al. | 323/288 |
| 2007/0152647 A1* | 7/2007 | Liao | 323/282 |
| 2007/0217698 A1 | 9/2007 | Son | |
| 2007/0247131 A1 | 10/2007 | Sohma | |
| 2008/0122551 A1* | 5/2008 | Lee et al. | 332/109 |

FOREIGN PATENT DOCUMENTS

| | | |
|---|---|---|
| CN | 1822479 A | 8/2006 |
| JP | 2002-165384 | 6/2002 |
| JP | 2004-229369 | 8/2004 |
| JP | 2006-33958 | 2/2006 |
| JP | 2006-166667 | 6/2006 |
| JP | 2006-246626 | 9/2006 |

OTHER PUBLICATIONS

Oct. 27, 2010 Korean official action (with English translation thereof) in connection with a counterpart Korean patent application.

Lee, Dong-Yun, et al. (2002), "A New Sensorless Control Scheme Using Simple Duty Feedback Technique in DC/DC Converters", Journal of Power Electronic, vol. 7, No. 6., pp. 554-562.

Apr. 25, 2011 Chinese official action in connection with a counterpart Chinese patent application.

* cited by examiner

SWITCHING REGULATOR CAPABLE OF STABLE OPERATION AND IMPROVED FREQUENCY CHARACTERISTICS IN A BROAD INPUT AND OUTPUT VOLTAGE RANGE AND METHOD FOR CONTROLLING OPERATION THEREOF

TECHNICAL FIELD

This disclosure relates to a switching regulator capable of stable operation in a broad input and output voltage range and a method for controlling operation thereof.

BACKGROUND ART

Conventional methods for controlling a switching regulator have employed voltage control in which only an output voltage is fed back.

In order to improve frequency characteristics of switching regulators using such a voltage control method, current control has been used (refer to Patent Document 1, for example), in which the output voltage and an output current are fed back. Further, as a similar method, PID control has been used, in which stability is improved using an approximate differentiator from the output voltage feedback.

The switching regulator using the voltage control method controls an inductor current and generates a certain output voltage at a predetermined constant voltage by charging an output smoothing capacitor with the inductor current. In such a switching regulator, the output voltage is fed back and the output current is generated in order to control the output voltage, so that the switching regulator has characteristics of a secondary resonance frequency as inherent characteristics of the switching regulator. The resonance frequency characteristics reduce stability of a control loop and complicate a structure of the switching regulator. Accordingly, it is necessary to reduce a gain of the control loop in order to maintain the stability and this poses a problem in that transient response characteristics are reduced.

Further, the current control method in which the output voltage and the output current are fed back has been used in order to improve the frequency characteristics of the switching regulator of an output voltage feedback type using the voltage control method. The output current is fed back to control the output current, so that the switching regulator has characteristics of a primary frequency and control is readily performed. Accordingly, it is possible to increase the gain of the control loop, so that it is possible to improve the transient response characteristics of the switching regulator.

Patent Document 1: Japanese Laid-Open Patent Application No. 2006-33958

However, in the current control method, the current is converted to the voltage and fed back, so that a current sensing resistor is necessary. When a resistance value of the current sensing resistor is large, efficiency of the switching regulator is reduced, so that it is necessary to use a resistor with several dozens of mΩ for the current sensing resistor. However, such a resistor has been expensive. Further, since a sense voltage by the current sensing resistor is a minute voltage, there has been a problem in that the minute voltage is likely to be affected by a noise. Further, as a method without the use of such a current sensing resistor, a method using on-resistance of a driver transistor has been employed (a drain voltage of the driver transistor is used). This method is more advantageous than the current sensing resistor in terms of cost and efficiency because no resistor is used.

However, due to switching of the driver transistor, it is difficult to adjust timing for detecting the drain voltage when the driver transistor is switched on. Further, because of generation of a switching surge of the driver transistor, it is impossible to detect a voltage immediately after the driver transistor is switched on and this has been problematic in that a delay of the detection timing is generated. Moreover, since a minute voltage is used, there has been a problem in that the minute voltage is very likely to be affected by a noise in the same manner as in the method using the current sensing resistor. In addition, in the switching regulator using the current control method, when an on-duty cycle of PWM control exceeds 50%, a subharmonic resonance is generated. In order to remove the subharmonic resonance, a slope compensation circuit is required. Such a slope compensation circuit has a complicated structure and adjustment thereof has been very difficult.

Moreover, in the PID control method in which the stability is improved using the approximate differentiator from the output voltage feedback, theoretically, a differential value of the output voltage is fed back. In other words, a value close to a difference between the output current and the inductor current is fed back. Accordingly, it is possible to have frequency characteristics similar to those in the current control method. However, in the switching regulator of the PID control method, the output voltage is superposed by a large high-frequency noise due to ESR from smoothing capability or a surge voltage from an output node of the switching regulator. From the structure where the differentiator is used, it is apparent that such a high-frequency noise may become a factor in malfunction.

In this manner, although the current control method has a merit of good response characteristics, it has many demerits for the voltage control method. The PID control method uses the differentiator and thus is subject to noise. On the basis of these facts, currently, many switching regulators use the voltage control method.

SUMMARY

In an aspect of this disclosure, there is provided a switching regulator and a method for controlling operation thereof that can provide stable control and improve frequency characteristics.

According to another aspect of this disclosure, there is provided a switching regulator for converting a supply voltage input to an input terminal into a predetermined constant voltage and outputting the predetermined constant voltage as an output voltage from an output terminal, comprising: a switching element performing switching in accordance with an input control signal; an inductor charged with the supply voltage by the switching of said switching element; a rectifying element discharging said inductor when said switching element is switched off and charging of said inductor is stopped; and a control circuit unit generating an error voltage based on a difference of voltage between a proportional voltage proportionate to the output voltage and a predetermined reference voltage, generating a pulse signal with a duty cycle in accordance with the error voltage, and outputting the pulse signal to a control electrode of said switching element so as to perform switching control of said switching element, wherein said control circuit unit generates a feedback voltage in accordance with the duty cycle of the pulse signal, generates the pulse signal with the duty cycle based on a difference of voltage between the generated feedback voltage and the error voltage, and varies the difference of voltage in accordance with the duty cycle of the pulse signal, thereby performing feedback control.

In the aforementioned switching regulator, said control circuit unit may compare the error voltage with the feedback voltage and generate the pulse signal with a duty cycle based on a result of the comparison.

In the aforementioned switching regulator, said control circuit unit may include: an error voltage generating circuit unit generating and outputting the error voltage based on the difference of voltage between the proportional voltage proportionate to the output voltage and the predetermined reference voltage; a pulse modulating circuit unit generating the pulse signal with the duty cycle in accordance with the error voltage and outputting the pulse signal to the control electrode of said switching element so as to perform switching control of said switching element; and a feedback circuit unit generating and outputting the feedback voltage in accordance with the duty cycle of the pulse signal, wherein said pulse modulating circuit unit may compare the error voltage with the feedback voltage and generate the pulse signal with a duty cycle based on a result of the comparison.

In the aforementioned switching regulator, said feedback circuit unit may generate the feedback voltage by integrating the pulse signal.

In the aforementioned switching regulator, said feedback circuit unit may include: a first switch performing switching in accordance with the pulse signal; a second switch performing switching opposite to the switching of said first switch in accordance with the pulse signal; a capacitor; a constant current source performing charging by supplying a predetermined constant current to said capacitor in accordance with the switching of said first switch; and a resistor forming a predetermined time constant when said capacitor is discharged in accordance with the switching of said second switch.

In the aforementioned switching regulator, said feedback circuit unit may integrate the pulse signal and add a slope voltage having a voltage tilt in accordance with the duty cycle of the pulse signal to a signal with ripple obtained by the integration so as to generate the feedback voltage.

In the aforementioned switching regulator, said feedback circuit unit may include: a first switch performing switching in accordance with the pulse signal; a second switch performing switching opposite to the switching of said first switch in accordance with the pulse signal; a capacitor; a constant current source performing charging by supplying a predetermined constant current to said capacitor in accordance with the switching of said first switch; a resistor forming a predetermined time constant when said capacitor is discharged in accordance with the switching of said second switch; and a slope voltage generating circuit generating the slope voltage and adding the generated slope voltage to a voltage of a charging and discharging terminal of said capacitor at a time of charging so as to generate the feedback voltage.

In the aforementioned switching regulator, said feedback circuit unit may include: a first switch performing switching in accordance with the pulse signal; a second switch performing switching opposite to the switching of said first switch in accordance with the pulse signal; a resistor; a capacitor supplied with a current to be charged via said resistor in accordance with the switching of said first switch; a constant current source discharging said capacitor in accordance with the switching of said second switch; and a slope voltage generating circuit generating the slope voltage and adding the generated slope voltage to a voltage of a charging and discharging terminal of said capacitor at a time of charging so as to generate the feedback voltage.

In the aforementioned switching regulator, said error voltage generating circuit unit may include: an output voltage detecting circuit dividing the output voltage and generating and outputting the proportional voltage; a reference voltage generating circuit generating and outputting the reference voltage; and an error amplifying circuit amplifying the difference of voltage between the proportional voltage and the reference voltage and generating and outputting the error voltage.

In the aforementioned switching regulator, said pulse modulating circuit unit may include: a voltage comparison circuit comparing the error voltage with the feedback voltage and generating and outputting a binary signal indicating a result of the comparison; and an RS flip-flop circuit receiving a predetermined clock signal at one input terminal and an output signal of said voltage comparison circuit at the other input terminal and generating and outputting the pulse signal based on each signal level of the output signal and the clock signal.

According to another aspect of this disclosure, there is provided a method for controlling operation of a switching regulator including: a switching element performing switching in accordance with an input control signal; an inductor charged with an input voltage input to an input terminal by the switching of said switching element; and a rectifying element discharging said inductor when said switching element is switched off and charging of said inductor is stopped, said method comprising: generating an error voltage based on a difference of voltage between a proportional voltage proportionate to an output voltage output from an output terminal and a predetermined reference voltage; generating a pulse signal with a duty cycle in accordance with the error voltage and outputting the pulse signal to a control electrode of said switching element so as to perform switching control of said switching element; converting the input voltage input to said input terminal into a predetermined constant voltage and outputting the predetermined constant voltage as the output voltage; generating a feedback voltage in accordance with the duty cycle of the pulse signal; generating the pulse signal with the duty cycle based on a difference of voltage between the generated feedback voltage and the error voltage; and varying the difference of voltage in accordance with the duty cycle of the pulse signal, thereby performing feedback control.

In the aforementioned method for controlling operation of a switching regulator, the error voltage may be compared with the feedback voltage, and the pulse signal with the duty signal may be generated based on a result of the comparison.

In the aforementioned method for controlling operation of a switching regulator, the feedback voltage may be generated by integrating the pulse signal.

In the aforementioned method for controlling operation of a switching regulator, the pulse signal may be integrated and a slope voltage having a voltage tilt in accordance with the duty cycle of the pulse signal may be added to a signal with ripple obtained by the integration so as to generate the feedback voltage.

According to the switching regulator and the method for controlling the operation of the switching regulator, the feedback voltage is generated in accordance with the duty cycle of the pulse signal, the pulse signal with the duty cycle is generated based on the difference of voltage between the generated feedback voltage and the error voltage, and the difference of voltage is varied in accordance with the duty cycle of the pulse signal, thereby performing feedback control. In accordance with this, it is possible to compensate for a delay of a fluctuation of the error voltage relative to a fluctuation of the output voltage, to improve stability of control, and to improve the frequency characteristics.

Further, the pulse signal is integrated and the slope voltage having a voltage tilt in accordance with the duty cycle of the pulse signal is added to a signal with ripple obtained by the integration so as to generate the feedback voltage. Accordingly, even when the duty cycle of the pulse signal becomes not less than 50%, it is possible to stabilize an operation of generating the feedback voltage.

Other objects, features and advantage of the present invention will become more apparent from the following detailed description when read in conjunction with the accompanying drawings.

BEST MODE FOR CARRYING OUT THE INVENTION

Figure 1:
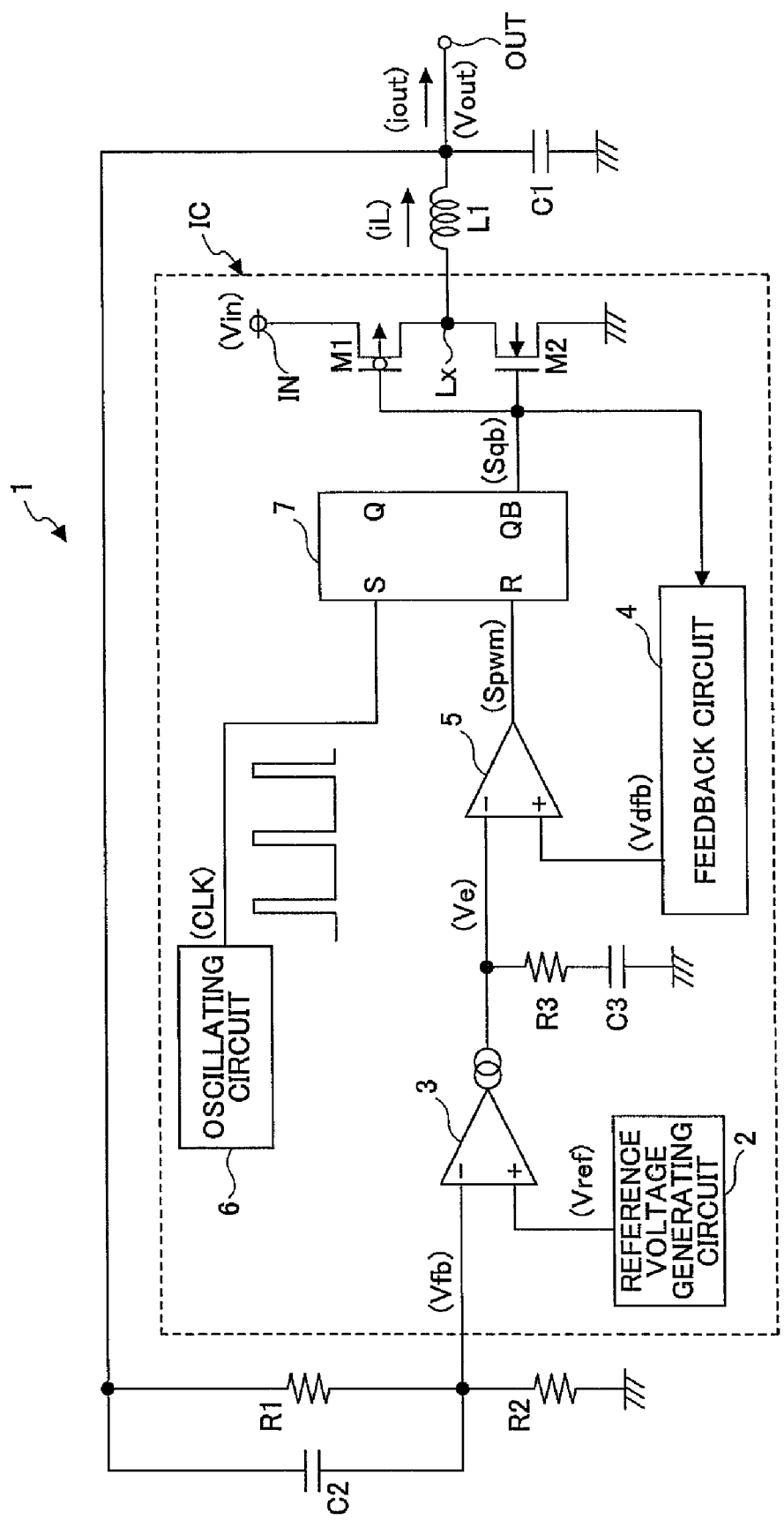
FIG. 1 is a diagram showing an example of a circuit of a switching regulator in a first embodiment of the present invention.

The present invention is described in detail based on the embodiments illustrated in the drawings.

First Embodiment

FIG. 1 is a diagram showing an example of a circuit of a switching regulator in a first embodiment of the present invention.

A switching regulator 1 of FIG. 1 constitutes a step-down switching regulator in which an input voltage Vin input to an input terminal IN is reduced to a predetermined constant voltage and is output as an output voltage Vout from an output terminal OUT.

The switching regulator 1 includes a switching transistor M1 having a PMOS transistor controlling an output of a current from the input terminal IN, a transistor M2 for synchronous rectification having an NMOS transistor, an inductor L1, a capacitor C1 for smoothing, resistors R1 and R2 for detecting an output voltage in which the output voltage Vout is divided and a divided voltage Vfb is generated and output, a resistor R3 for phase compensation, and capacitors C2 and C3.

Further, the switching regulator 1 includes a reference voltage generating circuit 2 generating and outputting a predetermined reference voltage Vref, an error amplifying circuit 3 comparing the divided voltage Vfb with the reference voltage Vref, amplifying the difference of voltage, and generating and outputting an error voltage Ve, and a feedback circuit 4 generating and outputting a feedback voltage Vdfb in accordance with a duty cycle of a pulse signal input to a gate of the switching transistor M1. Moreover, the switching regulator 1 includes a PWM comparator 5 comparing the error voltage Ve from the error amplifying circuit 3 with the feedback voltage Vdfb and generating and outputting a PWM pulse signal Spwn for performing PWM control with a pulse width corresponding to the error voltage Ve, an oscillating circuit 6 generating and outputting a predetermined clock signal CLK, and an RS flip-flop circuit 7.

The switching transistor M1 constitutes a switching element and the transistor M2 for synchronous rectification constitutes a rectifying element, respectively. The reference voltage generating circuit 2, error amplifying circuit 3, feedback circuit 4, PWM comparator 5, oscillating circuit 6, RS flip-flop circuit 7, resistors R1 to R3 and capacitors C2 and C3 constitute a control circuit unit. The reference voltage generating circuit 2, error amplifying circuit 3, resistors R1 to R3 and capacitors C2 and C3 constitute an error voltage generating circuit unit, the PWM comparator 5, oscillating circuit 6, and RS flip-flop circuit 7 constitute a pulse modulating circuit unit, and the feedback circuit 4 constitutes a feedback circuit unit, respectively. Further, the resistors R1 and R2 constitute an output voltage detecting circuit and the PWM comparator 5 constitutes a voltage comparing circuit, respectively.

The switching transistor M1 is connected between the input voltage Vin and a drain of the transistor M2 for synchronous rectification and a source of the transistor M2 for synchronous rectification is connected to a ground voltage. When a connection portion between a drain of the switching transistor M1 and the transistor M2 for synchronous rectification is Lx, the inductor L1 is connected between the connection portion Lx and the output terminal OUT and a series circuit with the resistors R1 and R2 and the capacitor C1 are connected in parallel between the output terminal OUT and the ground voltage. Further, the capacitor C2 for phase compensation is connected in parallel to the resistor R1. The divided voltage Vfb as a voltage at a connection portion between the resistor R1 and the resistor R2 is input to an inverting input terminal of the error amplifying circuit 3 and the reference voltage Vref is input to a non-inverting input terminal of the error amplifying circuit 3. A series circuit with the resistor R3 and the capacitor C3 is connected between an output terminal of the error amplifying circuit 3 and a ground voltage and the series circuit constitutes a phase compensation circuit.

Moreover, the error voltage Ve from the error amplifying circuit 3 is input to an inverting input terminal of the PWM comparator 5 and the feedback voltage Vdfb is input to a non-inverting input terminal of the PWM comparator 5. The clock signal CLK from the oscillating circuit 6 is input to a set input terminal S of the RS flip-flop circuit 7 and the PWM pulse signal Spwn from the PWM comparator 5 is input to a reset input terminal R of the RS flip-flop circuit 7. A switch signal Sqb output as a pulse signal from an inverting output terminal QB of the RS flip-flop circuit 7 is input to each gate of the switching transistor M1 and the transistor M2 for synchronous rectification and to the feedback circuit 4.

In such a structure, the error amplifying circuit 3 generates the error voltage Ve by amplifying a difference of voltage between the divided voltage Vfb and the reference voltage Vref and outputs the error voltage Ve to the inverting input terminal of the PWM comparator 5. The PWM comparator 5 compares the error voltage Ve with the feedback voltage Vdfb from the feedback circuit 4. When the feedback voltage Vdfb is not more than the error voltage Ve, the PWM comparator 5 outputs a low-level PWM pulse signal Spwn. When a pulse of the clock signal CLK is input to the set input terminal S, the RS flip-flop circuit 7 outputs a high-level signal from a non-inverting output terminal Q and a low-level signal from the inverting output terminal QB, respectively, in accordance with a rising edge of the pulse. Further, when the PWM pulse signal Spwn from the PWM comparator 5 is input to the reset input terminal R, the RS flip-flop circuit 7 outputs a low-level signal from the non-inverting output terminal Q and a high-level signal from the inverting output terminal QB in accordance with a rising edge of the PWM pulse signal Spwn. The RS flip-flop circuit 7 gives priority to resetting and when the pulse of the clock signal CLK is input, if the PWM pulse signal Spwn is in the high level, the non-inverting output terminal Q is maintained at a low-level and the inverting output terminal QB is maintained at a high-level.

When a low-level switch signal Sqb is output from the RS flip-flop circuit 7, the switching transistor M1 is switched on for a conducting state, the transistor M2 for synchronous rectification is switched off for a non-conducting state, and electric power is supplied to the inductor L1, capacitor C1 for smoothing, and a load (not shown) connected to the output terminal OUT. When a high-level switch signal Sqb is output from the RS flip-flop circuit 7, the switching transistor M1 is switched off for the non-conducting state, the transistor M2 for synchronous rectification is switched on for the conducting state, and the energy accumulated in the inductor L1 and the capacitor C1 for smoothing is supplied to the load connected to the output terminal OUT.

When the feedback voltage Vdfb exceeds the error voltage Ve, the PWM comparator 5 outputs a high-level PWM pulse signal Spwn to reset the RS flip-flop circuit 7 and the high-level switch signal Sqb is output from the RS flip-flop circuit 7 regardless of the clock signal CLK. In accordance with this, the switching transistor M1 is switched off for the non-conducting state and the transistor M2 for synchronous rectification is switched on for the conducting state.

In this manner, the output voltage Vout is regulated such that when the divided voltage Vfb is greater than the reference voltage Vref, the output voltage Vout is reduced by reducing the error voltage Ve and when the divided voltage Vfb is smaller than the reference voltage Vref, the output voltage Vout is increased by increasing the error voltage Ve.

Figure 2:
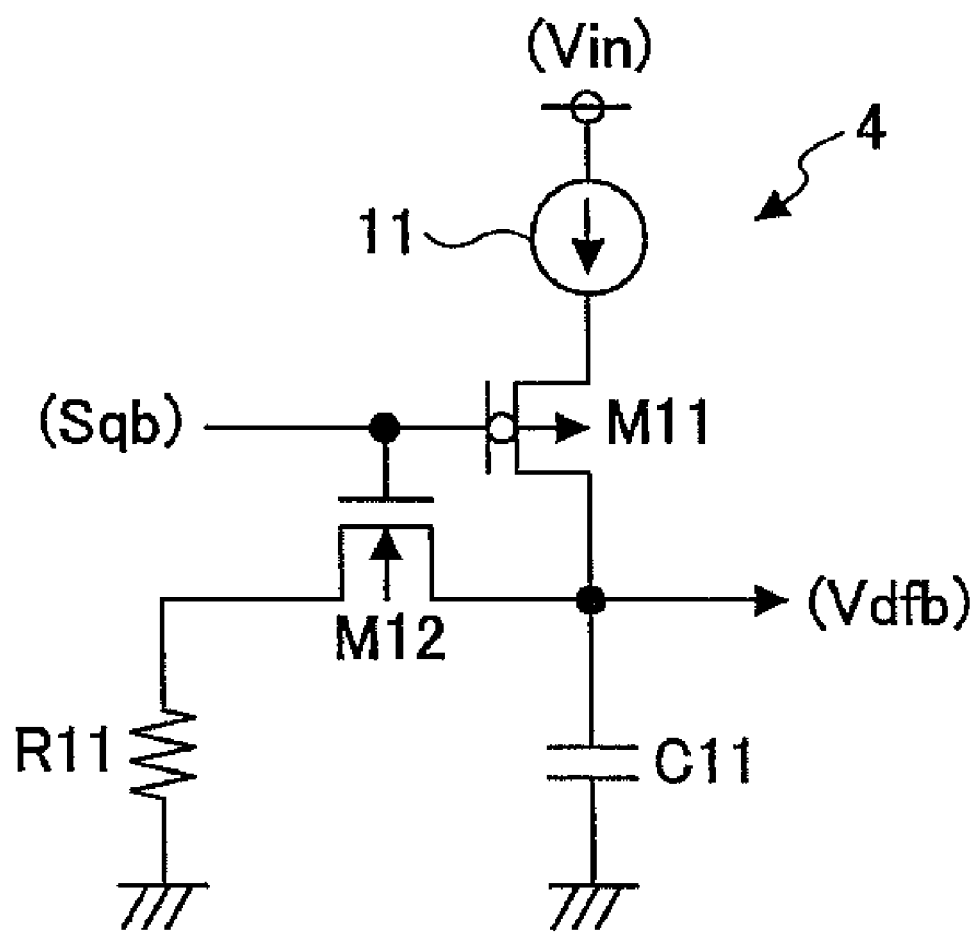
FIG. 2 is a diagram showing an example of a circuit of a feedback circuit of FIG. 1.
Figure 3:
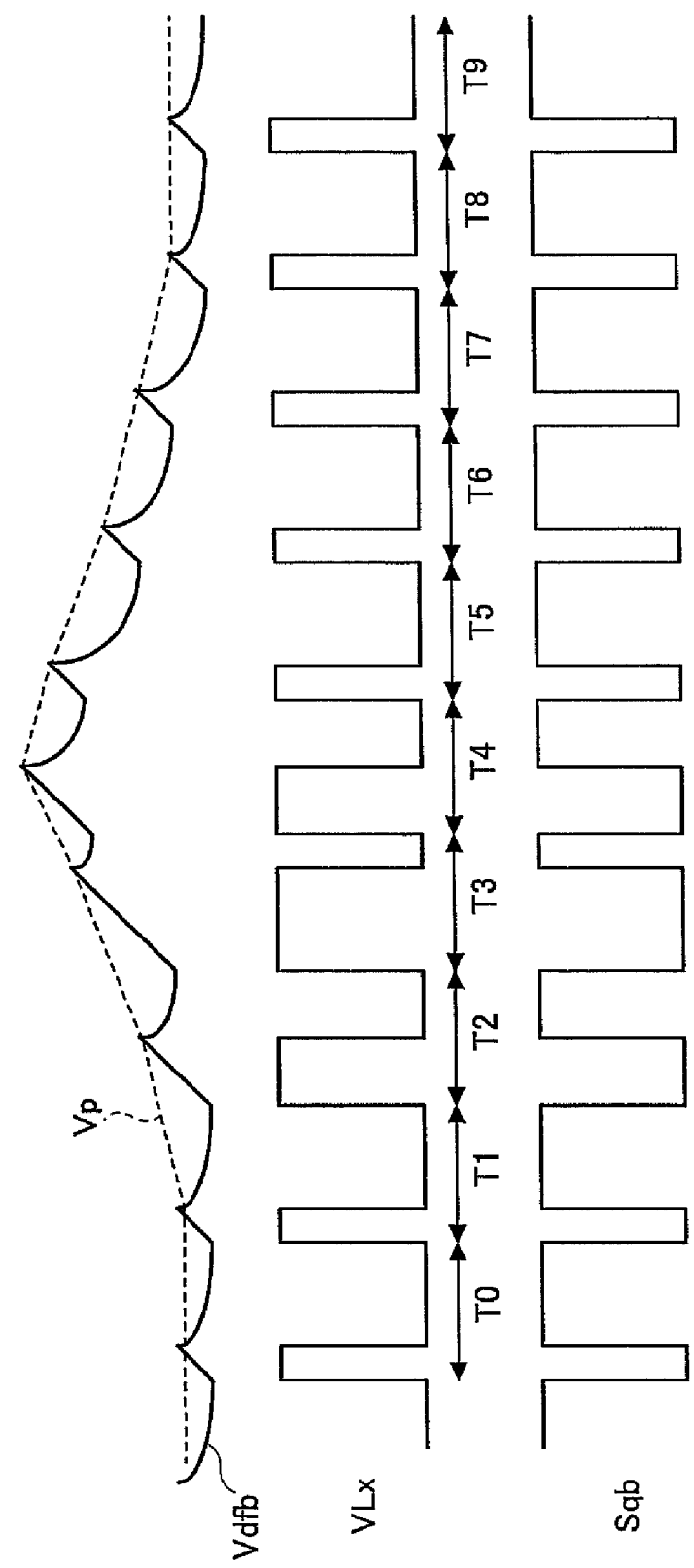
FIG. 3 is a timing chart showing an example of operation of a feedback circuit of FIG. 2.

FIG. 2 is a diagram showing an example of a circuit of the feedback circuit 4 of FIG. 1. FIG. 3 is a timing chart showing an example of operation of the feedback circuit 4 of FIG. 2. Reference Vlx of FIG. 3 indicates a voltage at the connection portion Lx.

In FIG. 2, the feedback circuit 4 includes a PMOS transistor M11, an NMOS transistor M12, a constant current source 11, a capacitor C11, and a resistor R11. The PMOS transistor M11 constitutes a first switch and the NMOS transistor M12 constitutes a second switch, respectively.

The constant current source 11 is connected between the input voltage Vin and a source of the PMOS transistor M11 and a predetermined constant current is supplied from the constant current source 11 to the source of the PMOS transistor M11. A series circuit with the NMOS transistor M12 and the resistor R11 and the capacitor C11 are connected in parallel between a drain of the PMOS transistor M11 and a ground voltage. Gates of the PMOS transistor M11 and the NMOS transistor M12 are connected and the switch signal Sqb from the RS flip-flop circuit 7 is input to the connection portion. The feedback voltage Vdfb is output from a connection portion among the PMOS transistor M11, NMOS transistor M12, and capacitor C11.

As understood from FIG. 3, when the switch signal Sqb signal is in the low level, the PMOS transistor M11 is switched on and the NMOS transistor M12 is switched off, the capacitor C11 is changed with the constant current from the constant current source 11, the constant current being input via the PMOS transistor M11, and the feedback voltage Vdfb is raised at a certain slope, which is referred to as an upslope. When the switch signal Sqb is in the high level, the PMOS transistor M11 is switched off and the NMOS transistor M12 is switched on, the electric charge accumulated in the capacitor C11 is discharged to the ground voltage via the NMOS transistor M12 and the resistor R11, and the feedback voltage Vdfb is reduced in accordance with a time constant of the capacitor C11 and the resistor R11, which is referred to as a downslope.

In FIG. 3, a duty cycle of the switch signal Sqb is constant in periods T0 and T1, so that a peak value Vp of the feedback voltage Vdfb (a voltage actually compared in the PWM comparator 5) is maintained at a certain voltage. In period T2, the duty cycle of the switch signal Sqb is increased, so that charging time to the capacitor C11 is increased and the peak value Vp of the feedback voltage Vdfb is increased. In period T3, the duty cycle of the switch signal Sqb is further increased, so that the feedback voltage Vdfb is increased at a slope greater than in period T2. In period T4, the duty cycle of the switch signal Sqb is reduced, so that an increment of the feedback voltage Vdfb is reduced.

In period T5, although the duty cycle of the switch signal Sqb is the same as in periods T0 and T1, the feedback voltage Vdfb is increased, so that an amount of discharge of the capacitor C11 is large and the peak value Vp of the feedback voltage Vdfb is reduced. In the same manner, in periods T6 and T7, although the duty cycle of the switch signal Sqb is constant, the feedback voltage Vdfb is greater than a steady point, so that the feedback voltage Vdfb continues to be reduced until it reaches the steady point. In periods T8 and T9, the feedback voltage Vdfb has returned to the steady point, so that the feedback voltage Vdfb shows the same change as in periods T0 and T1.

Figure 4:
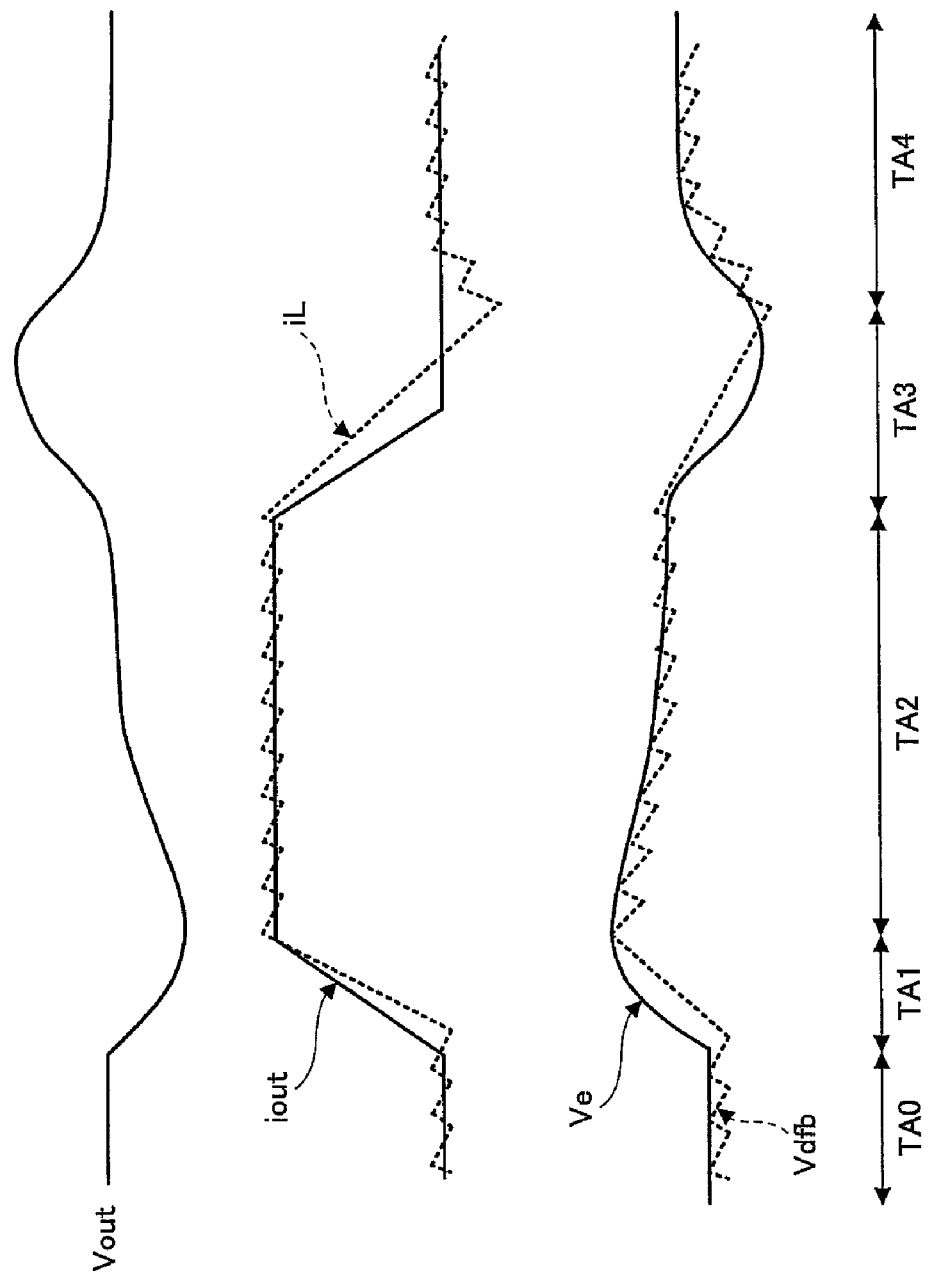
FIG. 4 is a diagram showing an example of a waveform of each voltage and each current when a load connected to an output terminal OUT is varied.

FIG. 4 is a diagram showing an example of a waveform of each voltage and each current when the load connected to the output terminal OUT is varied. Reference iout indicates an output current output from the output terminal OUT and reference iL indicates an inductor current flowing in the inductor L1, respectively. In the following, an operation of the switching regulator 1 shown in FIG. 1 is described using FIG. 4.

Referring to FIG. 4, in period TA0, the load connected to the output terminal OUT is constant, so that the peak value Vp of the feedback voltage Vdfb and the error voltage Ve are constant at each steady point.

In period TA1, the load is increased, the output voltage Vout is reduced until the inductor current iL reaches the output current iout, and the error voltage Ve is on the rise.

In period TA2, the inductor current iL has reached the output current iout, so that the reduction of the output voltage Vout is stopped. Thereafter, the error voltage Ve tries to return the output voltage Vout to a steady status in accordance with the feedback voltage Vdfb. Further, the duty cycle of the switch signal Sqb is slightly larger than in period TA0 in order to compensate for a loss caused by an increase of the output current iout, so that the feedback voltage Vdfb tries to be stable with a voltage larger than in period TA0. After a certain period time has elapsed, the output voltage Vout is stable, so that the peak value Vp of the feedback voltage Vdfb and the error voltage Ve return to each steady point.

In period TA3, the output current iout is reduced, the output voltage Vout is on the rise until the inductor current iL reaches the output current iout, and the error voltage Ve is reduced.

In period TA4, the inductor current iL has reached the output current iout, so that the increase of the output voltage Vout is stopped. Thereafter, the error voltage Ve tries to return the output voltage Vout to the steady status in accordance with the feedback voltage Vdfb.

Figure 5:
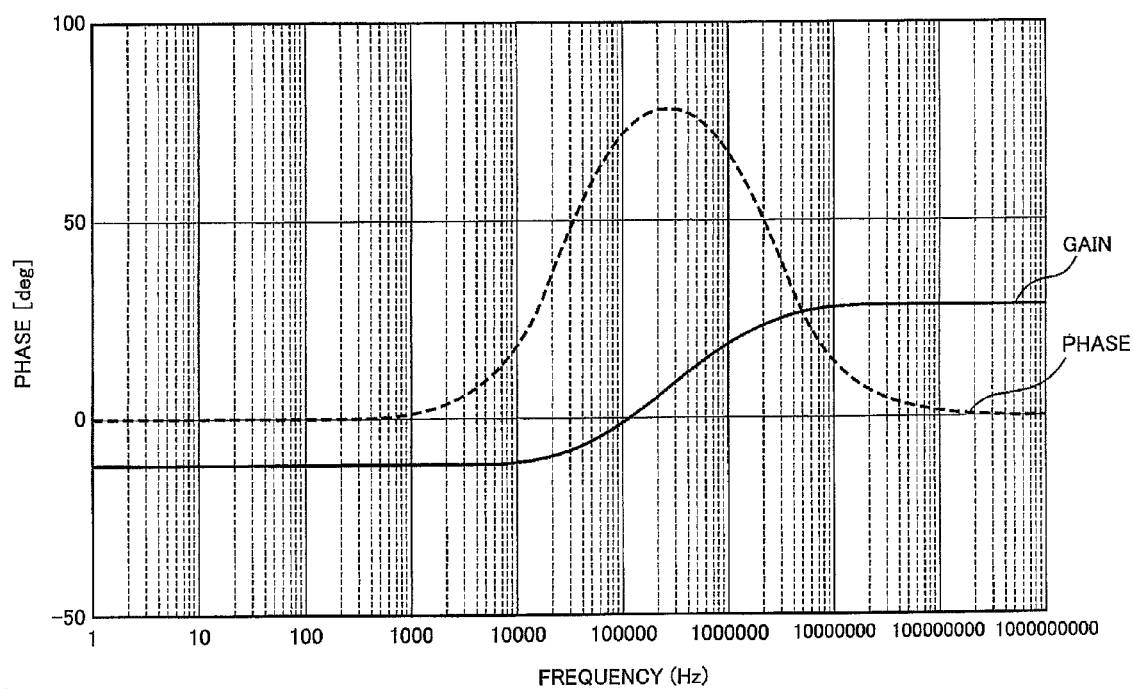
FIG. 5 is a diagram showing an example of frequency characteristics when a duty cycle of a switch signal Sqb is changed relative to a change of an error voltage Ve.

FIG. 5 is a diagram showing an example of frequency characteristics ΔDuty/ΔVe of a transfer function from a change ΔVe of the error voltage Ve to a change ΔDuty of the duty cycle of the switch signal Sqb. A solid line indicates a gain and a broken line indicates a phase, respectively.

As understood from FIG. 5, ΔDuty indicates differential frequency characteristics. This shows the same characteristics as in a derivative action in the PID control. However, while the PID control method has differential characteristics in the change ΔVe of the error voltage Ve relative to a change ΔVo of an output voltage Vo, the switching regulator 1 of FIG. 1 is greatly different in that it has differential characteristics in the change ΔDuty of the duty cycle of the switch signal Sqb relative to the change ΔVe of the error voltage Ve. In the feedback circuit 4, the differential characteristics are created on the basis of logic signals, so that the switching regulator 1 is substantially superior in noise tolerance to the PID control method.

In the PID control method, high-frequency gain must be reduced so as not to perform a derivative action on a surge of the output voltage. In practice, it is impossible to improve the frequency characteristics of the switching regulator at high frequencies and a phase design of a differentiating circuit is difficult. Further, a high-speed error amplifying circuit is necessary to prepare the differentiating circuit, so that the number of circuit elements and an amount of consumption current are increased. Accordingly, it is not practicable to use the differentiating circuit in the switching regulator.

By contrast, the switching regulator 1 of FIG. 1 is capable of realizing the feedback circuit 4 using a simple circuit as shown in FIG. 2 and noise tolerance poses no problem since input signals for the feedback circuit 4 are logic signals. In the feedback circuit 4, it is not necessary to consider an influence of input noise, so that differential characteristics can be maintained up to high frequencies by a circuit constant.

Figure 6:
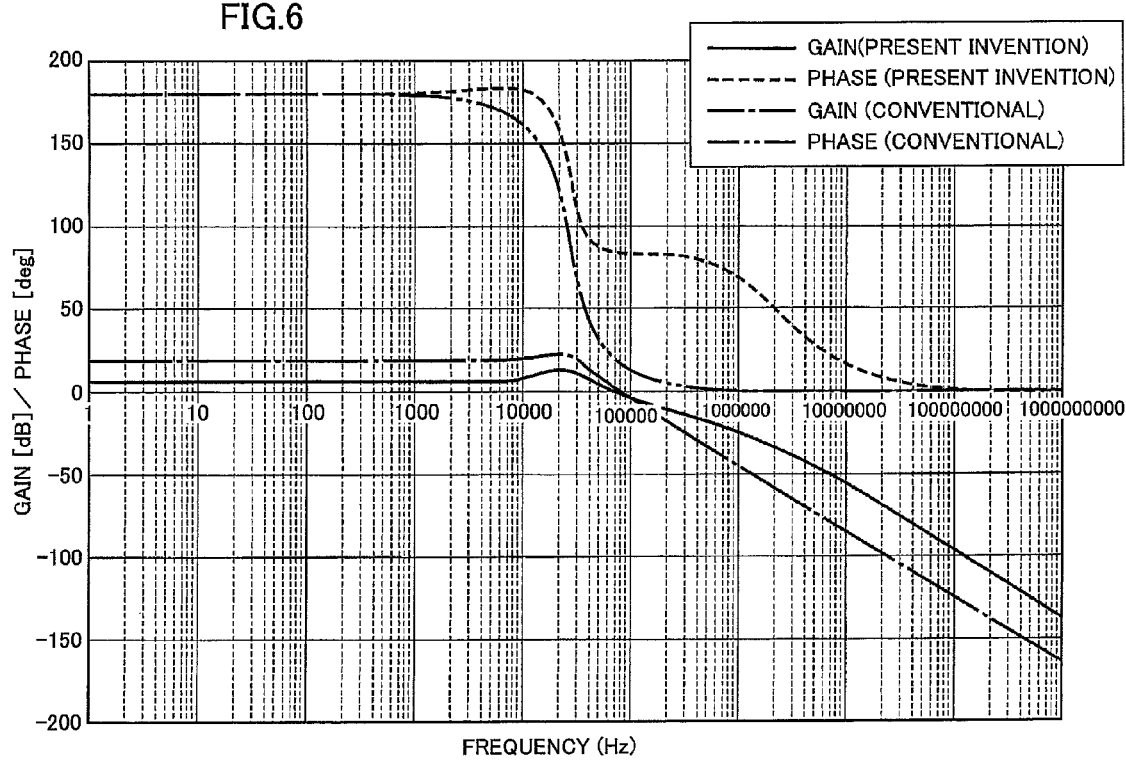
FIG. 6 is a diagram showing an example of frequency characteristics when an output voltage Vout is changed relative to a change of an error voltage Ve.

FIG. 6 is a diagram showing an example of frequency characteristics regarding a change ΔVout of the output voltage Vout relative to the change ΔVe of the error voltage Ve. A solid line indicates a gain, a broken line indicates a phase, an alternate long and short dash line indicates a gain of ΔVout in the switching regulator of a conventional voltage control method, and an alternate long and two short dashes line indicates a phase of ΔVout in the switching regulator of the conventional voltage control method, respectively. In FIG. 6, the frequency characteristics of the switching regulator of the conventional voltage control method are shown when the same oscillating frequency, inductor, and smoothing capacitor as in the switching regulator 1 of FIG. 1 are used.

As understood from FIG. 6, while the switching regulator of the conventional voltage control method has a steep phase fluctuation and a steep gain peak due to the resonance characteristics, the switching regulator 1 of FIG. 1 has a reduced gain and a mild phase fluctuation.

Figure 7:
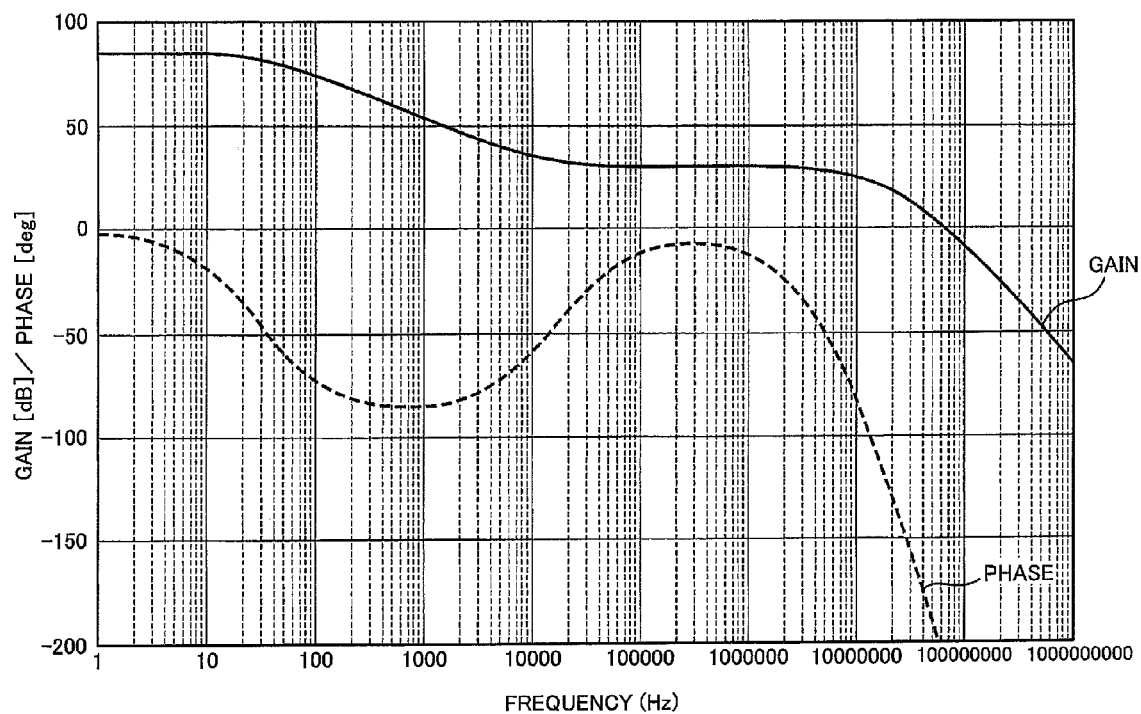
FIG. 7 is a diagram showing an example of frequency characteristics when an error voltage Ve is changed relative to a change of a divided voltage Vfb.
Figure 8:
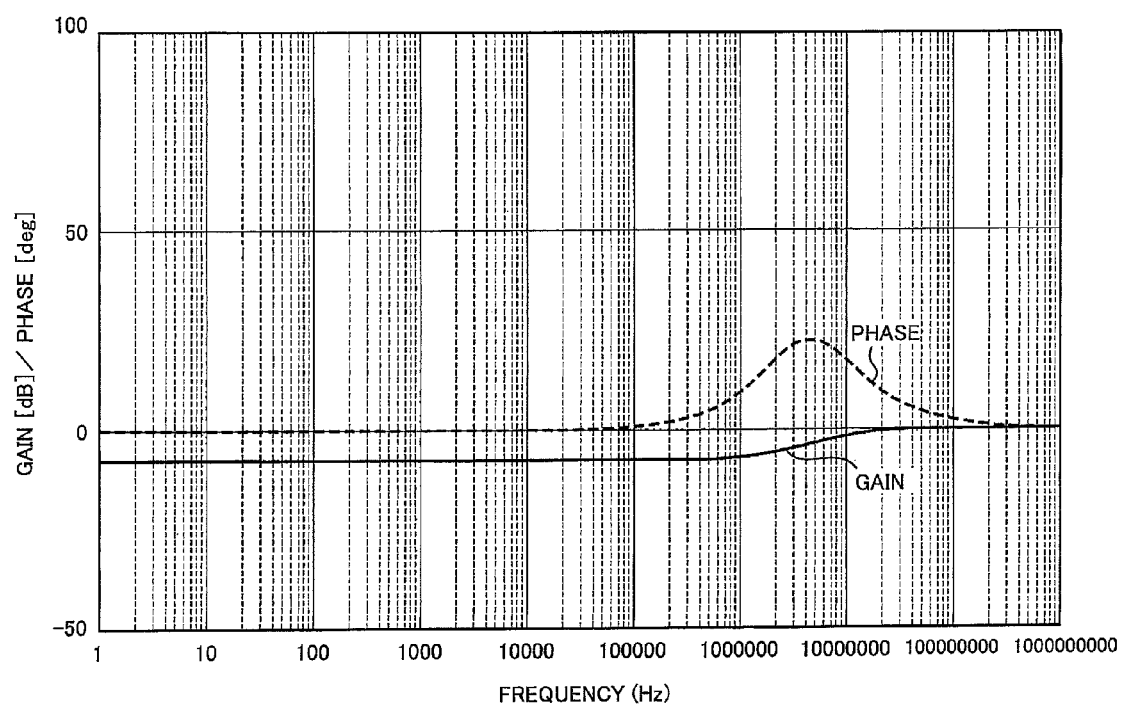
FIG. 8 is a diagram showing an example of frequency characteristics when a divided voltage Vfb is changed relative to a change of an output voltage Vout.

FIG. 7 is a diagram showing an example of frequency characteristics regarding the change ΔVe of the error voltage Ve relative to a change ΔVfb of the divided voltage Vfb. FIG. 8 is a diagram showing an example of frequency characteristics regarding the change ΔVfb of the divided voltage Vfb relative to the change ΔVout of the output voltage Vout. In FIG. 7 and FIG. 8, solid lines indicate a gain and broken lines indicate a phase, respectively.

Figure 9:
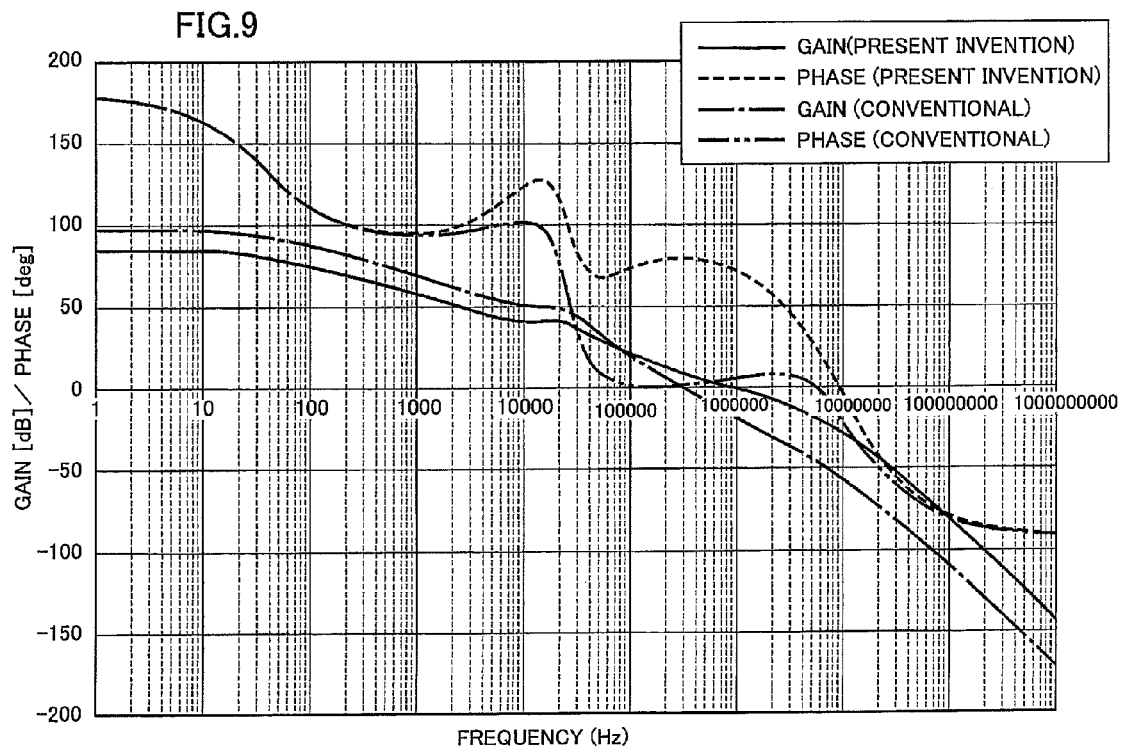
FIG. 9 is a diagram showing an example of frequency characteristics of an entire feedback system of a switching regulator of FIG. 1.

By superposing the frequency characteristics in FIG. 7 and FIG. 8 on the frequency characteristics in FIG. 6, frequency characteristics of an entire feedback system of the switching regulator 1 are obtained as shown in FIG. 9. In FIG. 9, a solid line indicates a gain of the switching regulator 1 and a broken line indicates a phase of the switching regulator 1, and an alternate long and short dash line indicates a gain of the switching regulator of the conventional voltage control method and an alternate long and two short dashes line indicates a phase of the switching regulator of the conventional voltage control method, respectively.

As understood from FIG. 9, in the switching regulator 1 of FIG. 1, the gain is extended to high frequencies and a phase margin is secured. By contrast, in the switching regulator of the conventional voltage control method, while the gain is not extended, the phase margin is not secured. If stability is to be obtained in the switching regulator of the conventional voltage control method, it is necessary to further reduce the gain to lower response performance.

In FIG. 1, the step-down switching regulator is shown in the example. However, this is an example and the present invention is not limited to this. It is possible to apply the present invention to a step-up switching regulator. In this case, the switching regulator is configured as shown in FIG. 10.

Figure 10:
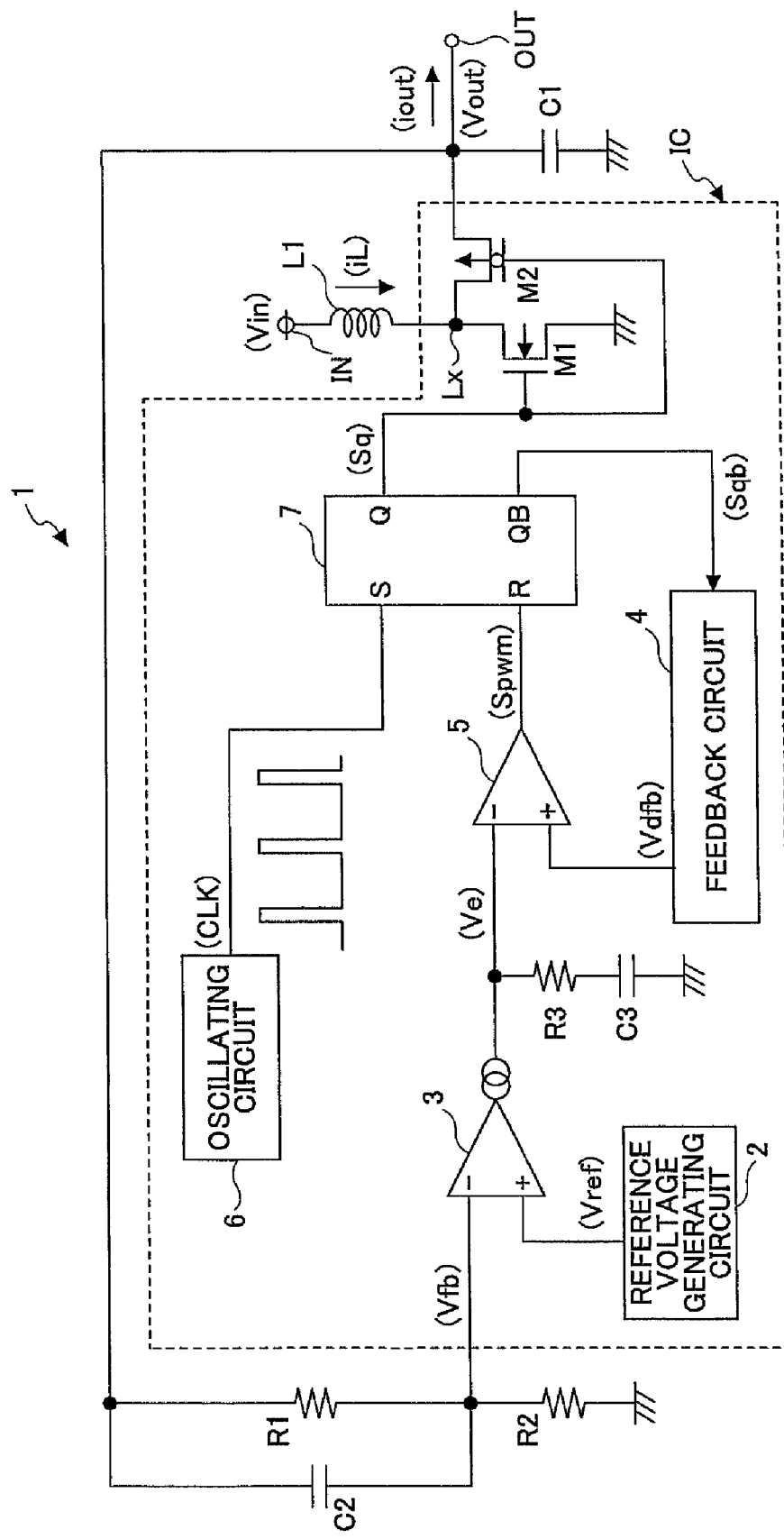
FIG. 10 is a diagram showing another example of a circuit of a switching regulator in a first embodiment of the present invention.

FIG. 10 is different from FIG. 1 in that the switching transistor M1 of FIG. 1 has an NMOS transistor and the transistor M2 for synchronous rectification of FIG. 1 has a PMOS transistor so as to change the connection among the switching transistor M1, transistor M2 for synchronous rectification, and inductor L1 and that a switch signal Sq output from the non-inverting output terminal Q of the RS flip-flop circuit 7 is input to each gate of the switching transistor M1 and the transistor M2 for synchronous rectification.

The inductor L1 and the switching transistor M1 are connected in series between the input terminal IN and the ground voltage and the transistor M2 for synchronous rectification is connected between the connection portion Lx between the inductor L1 and the switching transistor M1 and the output terminal OUT. Other configuration is the same as in FIG. 1 and an operation of each element is the same as in FIG. 1, so that description thereof is omitted.

In FIG. 1 and FIG. 10, the switching regulator of a synchronous rectification type is shown in the examples. However, it is possible to apply the present invention to a switching regulator of an asynchronous rectification type. In this case, the transistor M2 for synchronous rectification of FIG. 1 and FIG. 10 may be replaced with a rectifier diode. In the case of FIG. 1, an anode of the rectifier diode is connected the ground voltage and a cathode is connected to the drain of the switching transistor M1. In the case of FIG. 10, the anode of the rectifier diode is connected to the connection portion Lx and the cathode is connected to the output terminal OUT.

In this manner, the switching regulator in the first embodiment is configured to change a difference of voltage between the error voltage Ve and the feedback voltage Vdfb in accordance with the duty cycle of the switching signal input to the gate of the switching transistor M1. Accordingly, it is possible to compensate for a delay of a fluctuation of the error voltage Ve relative to a fluctuation of the output voltage Vout, to improve stability of control, and to improve the frequency characteristics.

Second Embodiment

In the feedback circuit 4 in the first embodiment, a slope voltage may be added to the feedback voltage Vdfb in accordance with the switch signal Sqb. The configuration prepared in this manner is used in a second embodiment.

Figure 11:
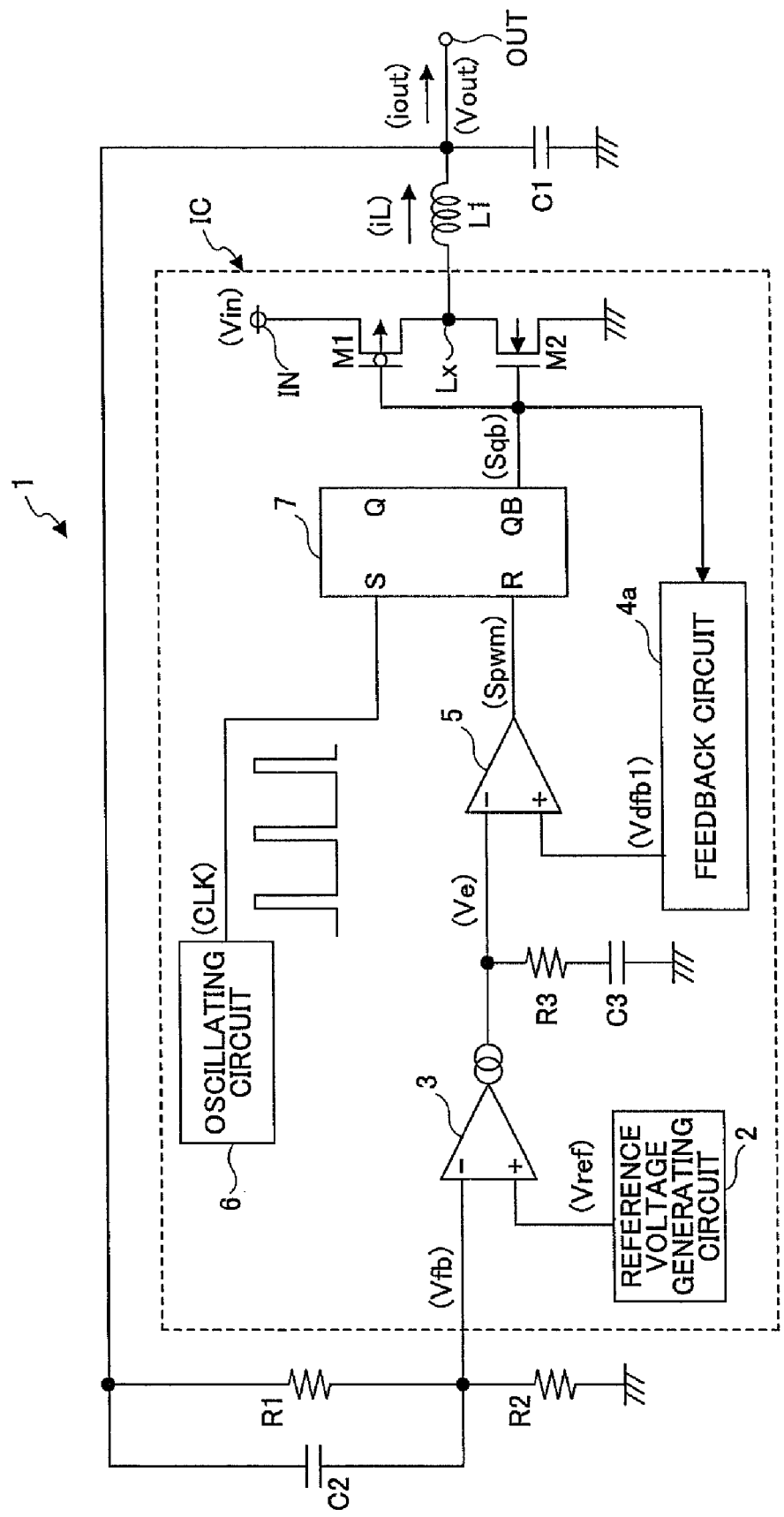
FIG. 11 is a diagram showing an example of a circuit of a switching regulator in a second embodiment of the present invention.

FIG. 11 is a diagram showing an example of a circuit of the switching regulator in the second embodiment of the present invention. In FIG. 11, the same or similar elements as in FIG. 1 are represented by the same reference numerals. In the following, description thereof is omitted and only those features differing from FIG. 1 are described.

FIG. 11 is different from FIG. 1 in that a slope adding circuit is added to the feedback circuit 4 of FIG. 1. In accordance with this, the feedback circuit 4 of FIG. 1 is configured to be a feedback circuit 4a and the switching regulator 1 of FIG. 1 is configured to be a switching regulator 1a.

The switching regulator 1a of FIG. 11 constitutes a step-down switching regulator in which the input voltage Vin input to the input terminal IN is reduced to a predetermined constant voltage and is output as the output voltage Vout from the output terminal OUT.

The switching regulator 1a includes the switching transistor M1, transistor M2 for synchronous rectification, inductor L1, capacitor C1 for smoothing, resistors R1 and R2, capacitor C3 for phase compensation, capacitors C2 and C3, reference voltage generating circuit 2, error amplifying circuit 3, feedback circuit 4a generating and outputting a feedback voltage Vdfb1 in accordance with the duty cycle of a pulse signal input to the gate of the switching transistor M1, PWM comparator 5 comparing the error voltage Ve from the error amplifying circuit 3 with the feedback voltage Vdfb1 and generating and outputting a PWM pulse signal Spwn for performing PWM control with a pulse width in accordance with the error voltage Ve, oscillating circuit 6, and RS flip-flop circuit 7.

An operation of the switching regulator 1a of FIG. 11 is the same as in FIG. 1 except that the feedback voltage Vdfb of FIG. 1 is changed to be the feedback voltage Vdfb1 in which the slope voltage is added to the feedback voltage Vdfb. Accordingly, description thereof is omitted.

Figure 12:
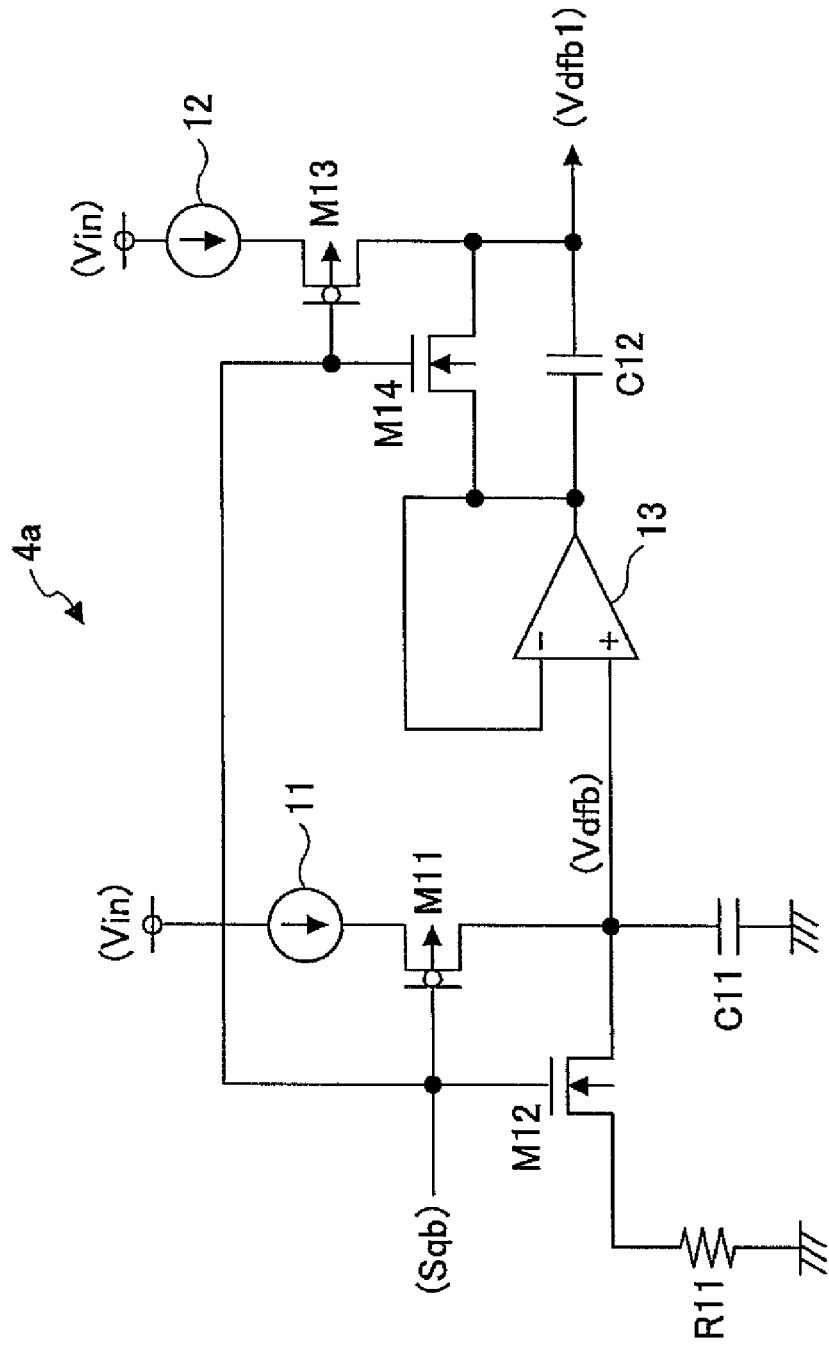
FIG. 12 is a diagram showing an example of a circuit of a feedback circuit of FIG. 11.
Figure 13:
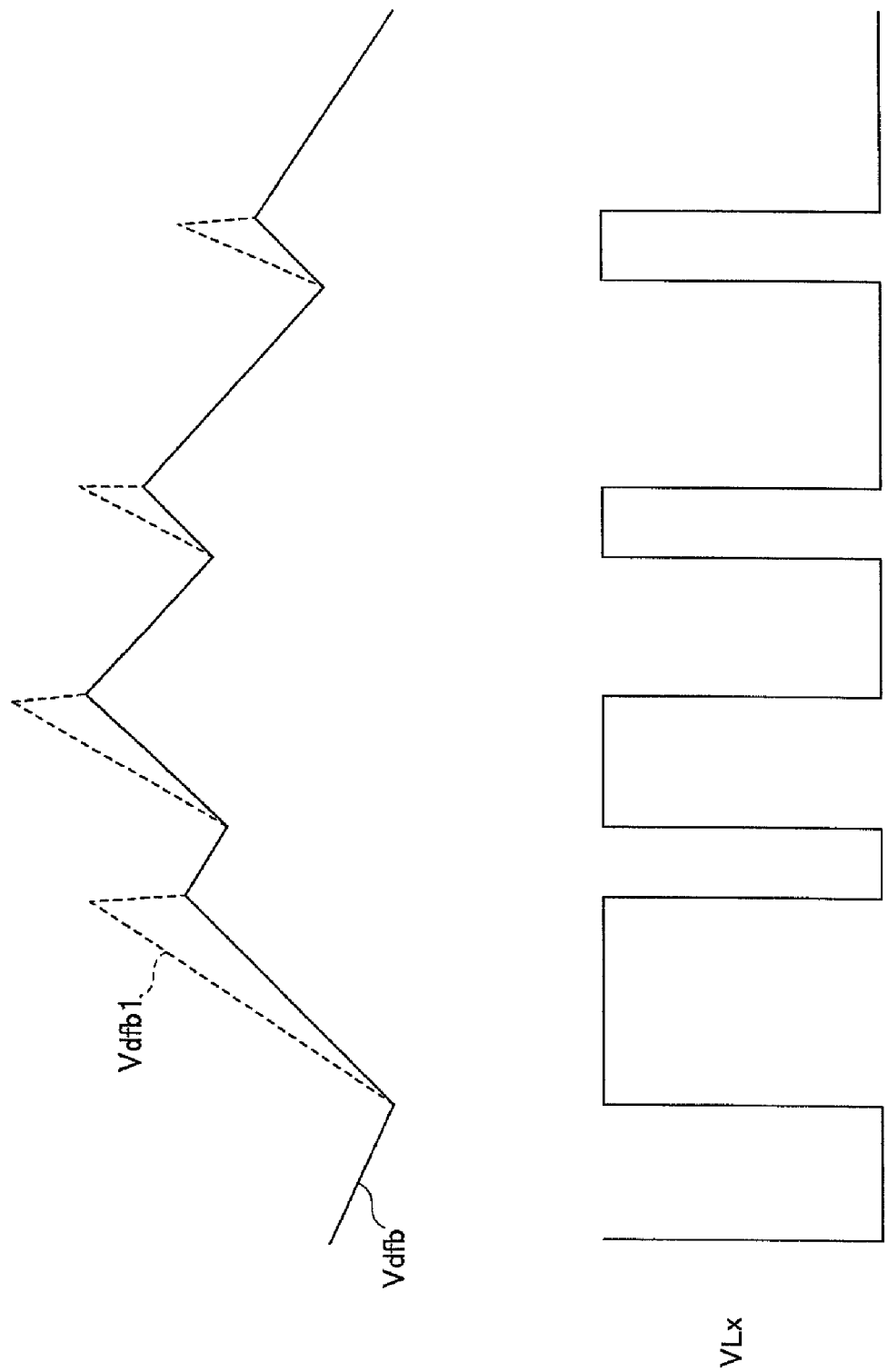
FIG. 13 is a timing chart showing an example of operation of a feedback circuit of FIG. 12.

FIG. 12 is a diagram showing an example of a circuit of the feedback circuit 4a. FIG. 13 is a timing chart showing an example of an operation of the feedback circuit 4a of FIG. 12. In FIG. 12, the same or similar elements as in FIG. 2 are represented by the same reference numerals. In the following, description thereof is omitted and only those features differing from FIG. 2 are described.

FIG. 12 is different from FIG. 2 in that a constant current source 12, operational amplifier circuit 13, PMOS transistor M13, NMOS transistor M14, and capacitor C12 are added.

In FIG. 12, the feedback circuit 4a includes the PMOS transistors M11 and M13, NMOS transistors M12 and M14, constant current sources 11 and 12, operational amplifier circuit 13, capacitors C11 and C12, and resistor R11. The constant current source 12, operational amplifier circuit 13, PMOS transistor M13, NMOS transistor M14, and capacitor C12 constitute a slope voltage generating circuit.

The constant current source 12 is connected between the input voltage Vin and a source of the PMOS transistor M13 and a predetermined constant current is supplied from the constant current source 12 to the source of the PMOS transistor M13. The NMOS transistor M14 and the capacitor C12 are connected in parallel between a drain of the PMOS transistor M13 and an output terminal of the operational amplifier circuit 13. In the operational amplifier circuit 13, the output terminal is connected to an inverting input terminal and the feedback voltage Vdfb is input to a non-inverting input terminal. Gates of each of the PMOS transistor M13 and the NMOS transistor M14 are connected and the switch signal Sqb is input to the connection portion. The feedback voltage Vdfb1 is output from a connection portion among the PMOS transistor M13, NMOS transistor M14, and capacitor C12.

In the feedback circuit 4 of FIG. 2, when the duty cycle of the switch signal Sqb exceeds 50% at a steady point, a gain relative to a fluctuation of the duty cycle of the feedback voltage Vdfb having a triangle wave exceeds 1, so that the operation becomes unstable in the same manner as in a switching regulator of the current control method where a slope adding circuit is required. Accordingly, it is necessary to add a slope voltage having not less than a ½ tilt of the downslope to the upslope in order to stabilize the operation. The constant current source 12, operational amplifier circuit 13, PMOS transistor M13, NMOS transistor M14, and capacitor C12 form a circuit adding the slope voltage to the upslope of the feedback voltage Vdfb.

The feedback voltage Vdfb is virtually short-circuited by the operational amplifier circuit 13, the slope voltage is added by the capacitor C12 and the constant current source 12, and the feedback voltage Vdfb1 is generated. The slope voltage is added when the switch signal Sqb is in a low level. When the switch signal Sqb is in a high level, the feedback voltage Vdfb1 is equal to the feedback voltage Vdfb.

FIG. 13 is a timing chart showing an example of the operation of the feedback circuit 4a of FIG. 12.

In FIG. 13, the downslope of the feedback voltage Vdfb is expressed basically by a function of resistance and self-discharge of capacity. However, approximate values are used with a straight line for simple description. A solid line indicates the feedback voltage Vdfb and a broken line indicates a waveform of the feedback voltage Vdfb1 in which the slope voltage having the ½ tilt of the downslope is added to feedback voltage Vdfb.

In the feedback voltage Vdfb1, while the upslope has a certain tilt by the constant current source and capacity, the downslope is generated by the resistance and capacity and is fluctuated in accordance with a steady point of the feedback voltage Vdfb determined by the duty cycle of the switch signal Sqb. Accordingly, the downslope of the feedback voltage Vdfb1 is not constant. In view of this, it is necessary to change an amount of the added slope voltage in accordance with the tilt of the downslope changed by the duty cycle of the switch signal Sqb or to determine the amount of the added slope voltage in accordance with a maximum tilt of the downslope. This applies to the slope compensation circuit in the switching regulator of the current control method in the same manner.

Figure 14:
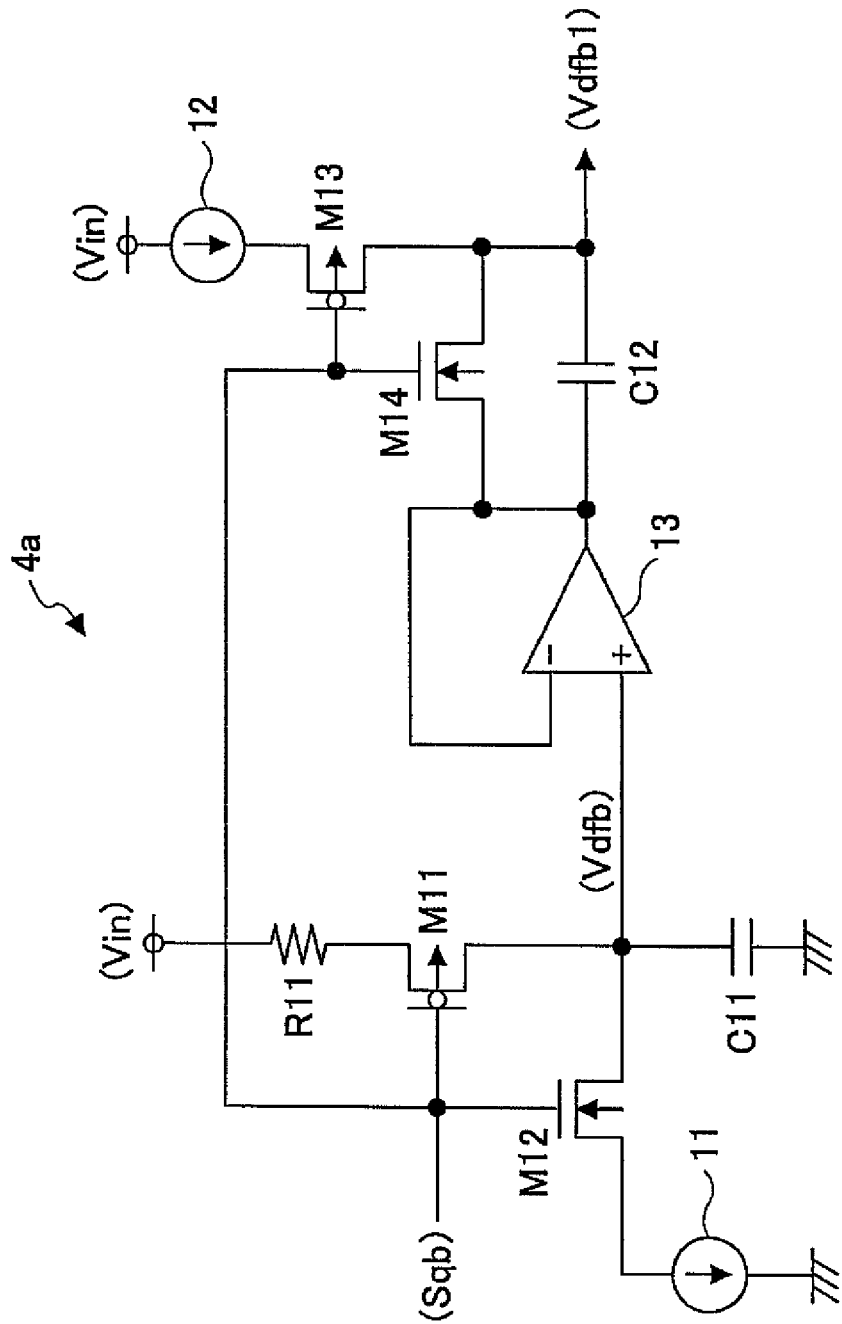
FIG. 14 is a diagram showing another example of a circuit of a feedback circuit of FIG. 11.

In order to change the amount of the added slope voltage in accordance with the fluctuating tilt of the downslope as in the feedback circuit 4a of FIG. 12, an additional control circuit is necessary. Further, when the amount of the added slope voltage is determined based on the maximum tilt of the downslope, differential characteristics of the feedback circuit 4a are unnecessarily reduced. FIG. 14 is a diagram showing an example of a circuit of the feedback circuit 4a by which such a problem is eliminated.

In FIG. 14, the upslope is generated by the resistance and capacity and the downslope is generated by the constant current source and capacity, so that the downslope of the feedback voltage Vdfb has a certain tilt in contrast with the case of FIG. 12. Thus, the amount of added slope voltage may always be constant, so that it is not necessary to perform the adjustment of the slope voltage as mentioned above.

In FIG. 11, the step-down switching regulator is shown in the example. However, it is possible to apply the present invention to a step-up switching regulator in the same manner as in the first embodiment. In this case, the feedback circuit 4a may be replaced with the feedback circuit 4 of FIG. 10 and the switching regulator 1a may be replaced with the switching regulator 1 of FIG. 10. Other elements are the same as in FIG. 10, so that description thereof is omitted.

Further, in the above-mentioned description, the switching regulator of a synchronous rectification type is shown in the example. However, it is possible to apply the present invention to a switching regulator of an asynchronous rectification type. In this case, the transistor M2 for synchronous rectification may be replaced with a rectifier diode in the same manner as in the first embodiment.

In this manner, the switching regulator in the second embodiment is configured to add the slope voltage to the feedback voltage Vdfb in accordance with the switch signal Sqb in the feedback circuit 4 of the first embodiment. Accordingly, it is possible to obtain the same effect as in the first embodiment, to further stabilize the operation of the feedback circuit, and to further improve stability of control.

The present invention is not limited to the specifically disclosed embodiment, and variations and modifications may be made without departing from the scope of the present invention.

The present application is based on Japanese priority application No. 2007-195865 filed Jul. 27, 2007, the entire contents of which are hereby incorporated herein by reference.

The invention claimed is:

1. A switching regulator for converting a supply voltage input to an input terminal into a predetermined constant voltage and outputting the predetermined constant voltage as an output voltage from an output terminal, comprising:
    a switching element configured to perform switching in accordance with an input control signal;
    an inductor charged with the supply voltage by the switching of said switching element;
    a rectifying element configured to discharge said inductor when said switching element is switched off and charging of said inductor is stopped; and
    a control circuit unit configured to generate an error voltage based on a difference of voltage between a proportional voltage proportionate to the output voltage and a predetermined reference voltage, generate a pulse signal with a duty cycle in accordance with the error voltage, and output the pulse signal to a control electrode of said switching element so as to perform switching control of said switching element, wherein
    said control circuit unit is configured to generate a feedback voltage in accordance with the duty cycle of the pulse signal, generate the pulse signal with the duty cycle based on a difference of voltage between the generated feedback voltage and the error voltage, vary the difference of voltage in accordance with the duty cycle of the pulse signal, thereby performing feedback control, integrate the pulse signal and add a slope voltage having a voltage tilt in accordance with the duty cycle of the pulse signal to a signal with ripple obtained by the integration so as to generate the feedback voltage.

2. The switching regulator according to claim 1, wherein said control circuit unit is configured to compare the error voltage with the feedback voltage and generate the pulse signal with a duty cycle based on a result of the comparison.

3. The switching regulator according to claim 2, wherein said control circuit unit includes:
    an error voltage generating circuit unit configured to generate and output the error voltage based on the difference of voltage between the proportional voltage proportionate to the output voltage and the predetermined reference voltage;
    a pulse modulating circuit unit configured to generate the pulse signal with the duty cycle in accordance with the error voltage and output the pulse signal to the control electrode of said switching element so as to perform switching control of said switching element; and
    a feedback circuit unit configured to generate and output the feedback voltage in accordance with the duty cycle of the pulse signal, wherein said pulse modulating circuit unit is configured to compare the error voltage with the feedback voltage and generate the pulse signal with a duty cycle based on a result of the comparison of the error voltage and the feedback voltage.

4. The switching regulator according to claim 3, wherein said feedback circuit unit is configured to generate the feedback voltage by integrating the pulse signal.

5. The switching regulator according to claim 3, wherein the pulse modulating circuit unit includes:
    a comparator, a first input terminal of the comparator being directly connected to the error voltage, and a second input terminal of the comparator being directly connected to the feedback voltage; and
    a flip-flop circuit configured to generate the pulse signal based on an output signal from the comparator.

6. The switching regulator according to claim 3, wherein said error voltage generating circuit unit includes:
    an output voltage detecting circuit configured to divide the output voltage and generate and output the proportional voltage;
    a reference voltage generating circuit configured to generate and output the reference voltage; and
    an error amplifying circuit configured to amplify the difference of voltage between the proportional voltage and the reference voltage and generate and output the error voltage.

7. The switching regulator according to claim 3, wherein said pulse modulating circuit unit includes:
    a voltage comparison circuit configured to compare the error voltage with the feedback voltage and generate and output a binary signal indicating a result of the comparison; and
    an RS flip-flop circuit configured to receive a predetermined clock signal at one input terminal and an output signal of said voltage comparison circuit at the other input terminal and generate and output the pulse signal based on each signal level of the output signal and the clock signal.

8. The switching regulator according to claim 4, wherein said feedback circuit unit includes:
- a first switch configured to perform switching in accordance with the pulse signal;
- a second switch configured to perform switching opposite to the switching of said first switch in accordance with the pulse signal;
- a resistor;
- a capacitor supplied with a current to be charged via said resistor in accordance with the switching of said first switch;
- a constant current source configured to discharge said capacitor in accordance with the switching of said second switch; and
- a slope voltage generating circuit configured to generate the slope voltage and add the generated slope voltage to a voltage of a charging and discharging terminal of said capacitor at a time of charging so as to generate the feedback voltage.

9. The switching regulator according to claim 4, wherein said feedback circuit unit includes:
- a first switch configured to perform switching in accordance with the pulse signal;
- a second switch configured to perform switching opposite to the switching of said first switch in accordance with the pulse signal;
- a capacitor;
- a constant current source configured to perform charging by supplying a predetermined constant current to said capacitor in accordance with the switching of said first switch; and
- a resistor configured to form a predetermined time constant when said capacitor is discharged in accordance with the switching of said second switch.

10. The switching regulator according to claim 4, wherein said feedback circuit unit includes:
- a first switch configured to perform switching in accordance with the pulse signal;
- a second switch configured to perform switching opposite to the switching of said first switch in accordance with the pulse signal;
- a capacitor;
- a constant current source configured to perform charging by supplying a predetermined constant current to said capacitor in accordance with the switching of said first switch;
- a resistor configured to form a predetermined time constant when said capacitor is discharged in accordance with the switching of said second switch; and
- a slope voltage generating circuit configured to generate the slope voltage and add the generated slope voltage to a voltage of a charging and discharging terminal of said capacitor at a time of charging so as to generate the feedback voltage.

11. A method for controlling operation of a switching regulator, said method comprising:
- switching by a switching element in accordance with an input control signal;
- charging an inductor with an input voltage by the switching of said switching element; and
- discharging said inductor when said switching element is switched off and charging of said inductor is stopped;
- generating an error voltage based on a difference of voltage between a proportional voltage proportionate to an output voltage output from an output terminal and a predetermined reference voltage;
- generating a pulse signal with a duty cycle in accordance with the error voltage and outputting the pulse signal to said switching element so as to perform switching control of said switching element;
- converting the input voltage into a predetermined constant voltage and outputting the predetermined constant voltage as the output voltage;
- generating a feedback voltage in accordance with the duty cycle of the pulse signal;
- generating the pulse signal with the duty cycle based on a difference of voltage between the generated feedback voltage and the error voltage;
- varying the difference of voltage in accordance with the duty cycle of the pulse signal, thereby performing feedback control;
- integrating the pulse signal; and
- adding a slope voltage having a voltage tilt in accordance with the duty cycle of the pulse signal to a signal with ripple obtained by the integration so as to generate the feedback voltage.

12. The method for controlling operation of a switching regulator according to claim 11, further comprising:
- comparing the error voltage with the feedback voltage; and
- generating the pulse signal with the duty cycle based on a result of the comparison.

13. The method for controlling operation of a switching regulator according to claim 11, further comprising generating the feedback voltage by integrating the pulse signal.

* * * * *